March 16, 1926.  1,576,901
A. M. COWEN
SPRING SUSPENSION FOR VEHICLES
Filed Nov. 11, 1924  2 Sheets-Sheet 1
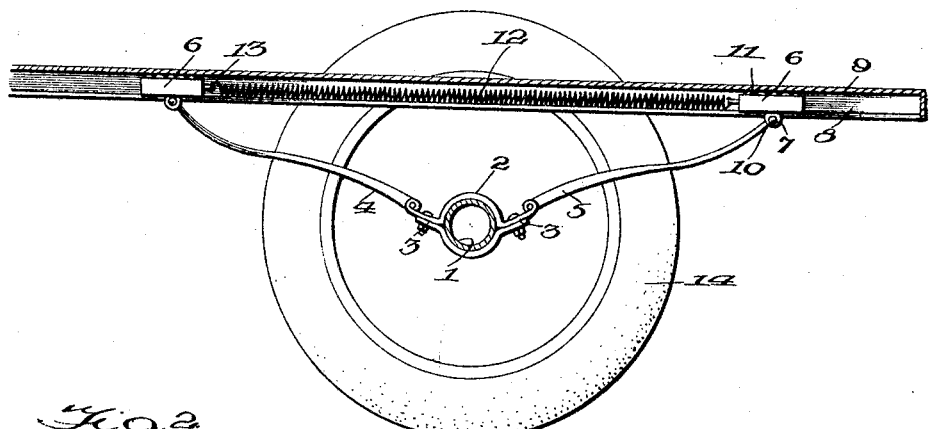
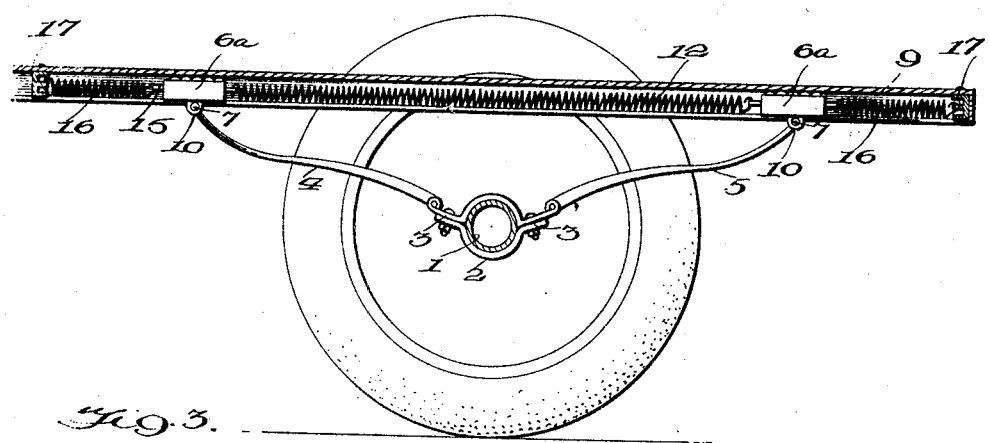
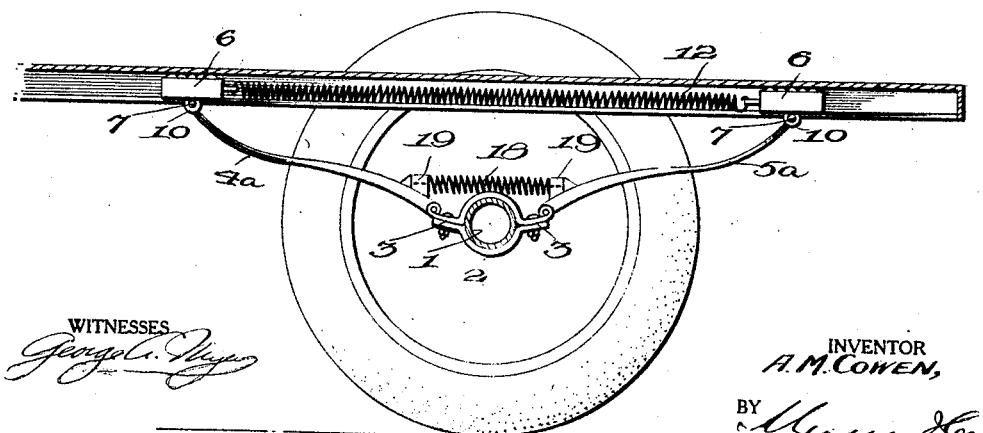
WITNESSES
INVENTOR
A. M. Cowen,
BY
ATTORNEYS March 16, 1926.  
A. M. COWEN  
1,576,901  
SPRING SUSPENSION FOR VEHICLES  
Filed Nov. 11, 1924    2 Sheets-Sheet 2
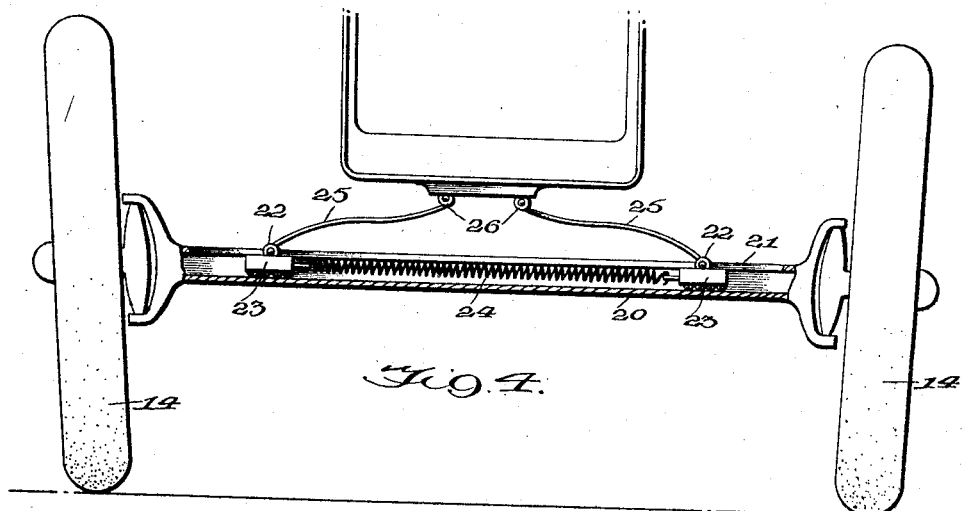
Fig. 4.
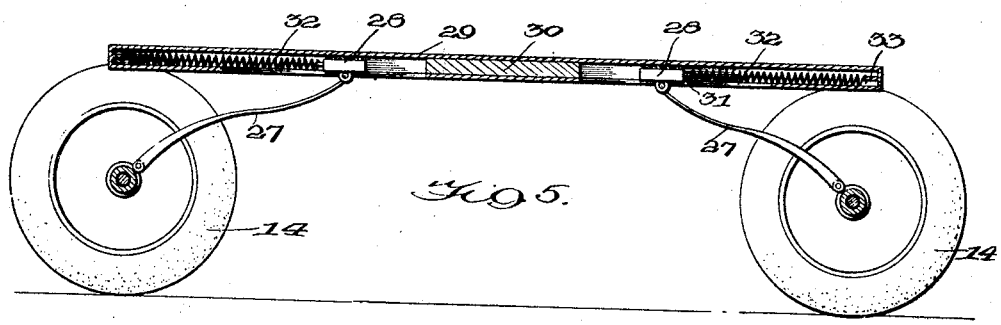
Fig. 5.
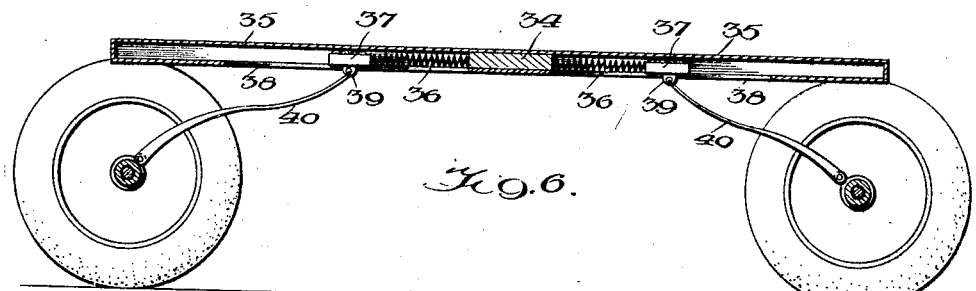
Fig. 6.
Fig. 7.
WITNESSES
INVENTOR  
A. M. COWEN,  
BY  
ATTORNEYS Patented Mar. 16, 1926.

1,576,901

UNITED STATES PATENT OFFICE.

ALFRED MARSDEN COWEN, OF NEW ORLEANS, LOUISIANA.

SPRING SUSPENSION FOR VEHICLES.

Application filed November 11, 1924. Serial No. 749,255.

*To all whom it may concern:*

Be it known that I, ALFRED MARSDEN COWEN, a citizen of the United States, and a resident of New Orleans, in the parish of Orleans and State of Louisiana, have invented certain new and useful Improvements in Spring Suspensions for Vehicles, of which the following is a specification.

This invention relates to a spring suspension for vehicles and has for its object the provision of a device for resiliently supporting the body of a vehicle on the axle and which will replace the usual vehicle springs.

A further object of the invention is the provision of a device for resiliently supporting the body of a vehicle on the axle and in which single leaf springs are connected to sliding carriages mounted in a guide with the carriages connected by a coil spring.

A further object of the invention is the provision of a device for supporting a vehicle body on the axles and in which the usual vehicle springs are replaced by a pair of leaf springs having one of their ends connected to sliding carriages mounted in a guide carried by a fixed part of the vehicle.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a vertical section of the preferred form of my spring suspension.

Figure 2 is a vertical section showing a slightly modified form of the device disclosed by Figure 1.

Figure 3 is a vertical section of another modified form of spring suspension.

Figure 4 is a vertical section of a spring suspension carried by the front axle of an automobile.

Figures 5 and 6 are vertical sections of modified forms of spring suspension.

Figure 7 shows a side view of still another form of spring suspension applied to an automobile.

Referring more particularly to the drawings, 1 designates an axle housing upon which is clamped a saddle 2 having outwardly extending flanges forming pivotal connections 3 for the inner adjacent ends of the pair of springs 4 and 5. The ends of each of the springs 4 and 5 is connected to a carriage 6 by means of a pair of ears 7 depending through a slot 8 in a channel guide 9. The bolts 10 supported by the ears 7 are adapted to receive an eye formed upon the ends of either of the springs 4 or 5.

Carriages 6 are equipped with rollers or ball bearings 11 whereby the carriage will readily ride within the guide 9. Said guide 9 is adapted to be rigidly connected to the chassis of the automobile as shown in Figure 1 or the guide may be secured in any approved manner to the housing 1 while the inner pivoted ends of the springs 4 and 5 may have pivotal connections with the chassis.

A coil spring 12 which is normally under tension at all times has its opposite ends connected with perforated lugs 13 projecting from the adjacent ends of the carriages 6. The spring 12 is mounted within the guide 9 and tends to pull the carriages 6 towards each other.

It will be seen that when the wheel 14 meets with an obstruction on a roadbed the wheels will be forced upwardly tending to expand the springs 4 and 5 which will move the carriages 6 outwardly from each other placing the spring 12 under greater tension. The spring 12 thus cooperates with the leaf springs 4 and 5 to not only support a chassis of the vehicle in spaced relation with the axle housing 1 but will tend to overcome the road shock and maintain an equilibrium between the axles and the chassis.

In the form shown in Figure 2 the carriages 6ª are provided with perforated lugs 15 projecting from the outer ends of the carriages and adapted to receive one end of a coiled spring 16. The other end of the spring is connected to a block 17 mounted in the guide 9. The operation of this form of spring suspension is identical with the construction shown in Figure 1 but the spring 16 tends to take up the rebound and cooperates with the main coil spring 12 for maintaining an equilibrium between the chassis and the axles during road travel.

Referring more particularly to Figure 3 the construction as shown is similar to the construction of Figure 1 with the exception that a coil spring 18 has its ends connected to lugs 19 formed on the spring arms 4ª and 5ª. Spring 18 functions as a compression spring and when in action checks rebound.

Instead of providing a separate and distinct guide as shown in Figures 1 to 3 inclusive, and securing the same to a chassis of a vehicle I construct the axle 20 in the shape of a guide which is rectangular in formation and provided with a slot 21 through which is adapted to ride the ears 22 mounted upon a carriage 23, as shown in Figure 4. A pair of these carriages are mounted in the axle 20 and are connected at their inner adjacent ends by means of a coil spring 24. Resilient arms 25 are pivotally connected with the ears 22 of the carriages 23 at one end while their other ends are pivotally connected with ears 26 projecting downwardly in spaced relation from the forward end of the chassis.

Referring to Figure 5 resilient arms 27 have pivotal connections with saddle embracing the front axle and the rear axle housing and are pivotally connected to carriages 28 in a guide 29. A yoke 30 mounted intermediate the ends of the guide is adapted to limit the forward movement of said carriages. The outer ends of the carriages are provided with perforated lugs 31 to which is connected one end of a coil spring 32. The other end of the coil spring is connected to an inwardly projecting lug 33 formed at each end of the guide 29. The coil springs 32 are normally maintained under tension and cooperate with the resilient arms 27 to reduce the shocks to the chassis incident to road travel.

In the construction shown in Figure 6 the block 34 is mounted intermediate the ends of a track or guide 35 and has a coil spring 36 connected to its opposite ends, the outer end of the coil spring being connected to a carriage 37 mounted for sliding movement with the guide 35. This carriage is provided with a slot 38 through which projects ears 29 connected to the upper end of resilient arm 40. The lower ends of the arms are connected to an axle or to the axle housing as the case may be.

In the construction shown in Figure 7 is a resilient arm 41 which has one end pivotally connected to a saddle 42 which embraces an axle housing 43. Intermediate the ends of the resilient arm 41 a bracket 44 is pivotally connected to upstanding lugs 45. The bracket at its other end is resiliently secured to the chassis 46. The outer free end 47 of the arm 41 is connected by means of a coil spring 48 to the outer end of the chassis 46 by means of a perforated lug 49. The bracket 44 will limit the outward movement of arm 47 and spring 48 will tend to resist the inward movement of said arm.

In the construction shown in Figure 5 the road shock to the wheels 14 will cause a pull on the spring 32 while in Figure 6 road shocks will cause a compression of the springs 36 between the carriages 37 and the block 34.

What I claim is:

1. A spring suspension for vehicles comprising a guide, a pair of carriages slidably mounted in said guide, a coil spring connecting said carriages, a pair of resilient arms having an end pivotally connected to a fixed point of the vehicle, the other end of each arm being connected to a movable carriage.

2. A spring suspension for vehicles comprising a guide, a pair of carriages slidably mounted in said guide, a coil spring connecting said carriages, a pair of resilient arms having an end pivotally connected to a part of the vehicle, the other end of each arm being connected to a movable carriage, and a second spring adapted to resist movement of the carriages and resilient arm.

3. A spring suspension for vehicles comprising a guide, a pair of carriages slidably mounted in said guide, a coil spring connecting said carriages, a pair of resilient arms having an end pivotally connected to a part of the vehicle, the other end of each arm being connected to a movable carriage, and coil springs mounted in the guide and resisting movement of the carriages towards each other.

4. A spring suspension for vehicles comprising a guide, a pair of carriages slidably mounted in said guide, a coil spring connecting said carriages, a pair of resilient arms having an end pivotally connected to a part of the vehicle, the other end of each arm being connected to a movable carriage, and coil springs connecting the movable carriages to the guide.

5. A spring suspension for vehicles comprising a guide, a pair of carriages slidably mounted in said guide, a saddle mounted upon the axle of the vehicle, resilient arms each having an end connected to the saddle with the other end pivotally connected with a carriage, and a coil spring connecting the carriages.

6. A spring suspension for vehicles comprising a guide, a pair of carriages slidably mounted in said guide, a saddle mounted upon the axle of the vehicle, resilient arms each having an end connected to the saddle with the other end pivotally connected with a carriage, and means for resisting movement of the carriages in one direction.

7. A spring suspension for vehicles comprising a guide in the shape of a channel arm, a pair of carriages provided with rollers slidably mounted in said guide, perforated ears projecting from the carriages and extending beyond the confines of the channel arm, a spring arm pivotally connected to each pair of perforated ears, the other ends of the arms being pivotally connected to a fixed point on the vehicle, and a spring connecting the carriages.

8. A spring suspension for vehicles comprising a guide connected with the frame of the vehicle, carriages slidably mounted in said guide, a saddle clamped to an axle of the vehicle, resilient arms having pivotal connections with the saddle, the other ends of the arms being pivotally connected with the carriages, and a resilient means connecting the carriages.

9. A spring suspension for vehicles comprising a guide connected with the frame of the vehicle, carriages slidably mounted in said guide, a saddle clamped to an axle of the vehicle, resilient arms having pivotal connections with the saddle, the other ends of the arms being pivotally connected with the carriages, and a coil spring connected with a carriage.

10. A spring suspension for vehicles comprising a guide connected with the frame of the vehicle, carriages slidably mounted in said guide, a saddle clamped to an axle of the vehicle, resilient arms having pivotal connections with the saddle, the other ends of the arms being pivotally connected with the carriages, and coil springs connecting the carriages with fixed points on the guide.

ALFRED MARSDEN COWEN.